United States Patent
Kennedy, III et al.

(10) Patent No.: US 6,301,480 B1
(45) Date of Patent: *Oct. 9, 2001

(54) SYSTEM AND METHOD FOR COMMUNICATING USING A VOICE NETWORK AND A DATA NETWORK

(75) Inventors: William C. Kennedy, III, Dallas; Kenneth R. Westerlage, Forth Worth; Dale E. Beasley, Flower Mound; Carl W. Drueckhammer, Plano, all of TX (US)

(73) Assignee: @Track Communications, Inc., Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,583

(22) Filed: Sep. 5, 1997

(51) Int. Cl.⁷ ..................................... H04Q 7/00
(52) U.S. Cl. ............................. 455/445; 455/456
(58) Field of Search ................... 455/412, 445, 455/466, 422, 456, 450, 457, 500, 525, 527; 370/349

(56) References Cited

U.S. PATENT DOCUMENTS

| | | | |
|---|---|---|---|
| 5,001,710 | 3/1991 | Gawrys et al. | 370/110.1 |
| 5,093,827 | 3/1992 | Franklin et al. | 370/60.1 |
| 5,289,371 | 2/1994 | Abel et al. | 364/401 |
| 5,311,577 | 5/1994 | Madrid et al. | 379/93 |
| 5,325,424 | 6/1994 | Grube | 379/94 |
| 5,371,534 | 12/1994 | Dagdeviren et al. | 348/14 |
| 5,428,608 | 6/1995 | Freeman et al. | 370/60.1 |
| 5,448,286 | 9/1995 | Decaesteke et al. | 348/17 |
| 5,454,027 | 9/1995 | Kennedy et al. | 379/60 |
| 5,467,390 | 11/1995 | Brankley et al. | 379/229 |
| 5,513,251 | 4/1996 | Rochkind et al. | 379/93 |
| 5,533,019 | 7/1996 | Jayapalan | 370/60.1 |
| 5,533,108 | 7/1996 | Harris et al. | 379/201 |
| 5,539,810 | 7/1996 | Kennedy, III et al. | 379/59 |
| 5,544,225 | 8/1996 | Kennedy, III et al. | 379/59 |
| 5,550,905 | 8/1996 | Silverman | 379/142 |
| 5,579,376 | 11/1996 | Kennedy, III et al. | 379/60 |
| 5,598,458 | 1/1997 | Bales et al. | 379/58 |
| 5,711,012 | 1/1998 | Bottoms et al. | 455/557 |
| 5,712,899 | * 1/1998 | Pace, II | 455/456 |
| 5,734,981 | 3/1998 | Kennedy, III et al. | 455/445 |
| 5,742,905 | * 4/1998 | Pepe et al. | 455/445 |
| 5,771,455 | 6/1998 | Kennedy, III et al. | 455/456 |
| 5,799,249 | 8/1998 | Kennedy, III et al. | 455/411 |
| 5,826,195 | 10/1998 | Westerlage et al. | 455/456 |

FOREIGN PATENT DOCUMENTS

| | | | |
|---|---|---|---|
| 0696149A2 | 2/1996 | (EP) | H04Q/7/32 |
| WO96/29831 | 9/1996 | (WO) | H04Q/7/22 |

OTHER PUBLICATIONS

PCT Search Report in International Serial No. PCT/US 98/18552, dated Dec. 23, 1998, 6 pages.

* cited by examiner

Primary Examiner—Thanh Cong Le
(74) Attorney, Agent, or Firm—Locke,Liddell & Sapp LLP

(57) ABSTRACT

A communication system includes mobile units, a network switching center, and service centers to provide a variety of services to mobile units. Using a voice network and a data network, the network switching center establishes a voice/data session between a mobile unit and an appropriate service center. The network switching center maintains a profile table that designates the service center and provides access parameters to establish the voice/data session.

58 Claims, 4 Drawing Sheets

FIG. 3

| MIN/ESN 204 | VIN 206 | SERVICE CENTER ID | | | | | |
|---|---|---|---|---|---|---|---|
| | | 01 | 02 | 03 | 04 | 05 | 06 |
| 099-880-1234 | – | 12 | 12 | – | – | 47 | 62 |
| 214-555-1212 | 8163549QVR693 | 12 | – | – | 83 | – | – |
| – | 445ABC692X4Z | 96 | 96 | – | – | 96 | – |
| 093462186784 | – | 42 | 41 | – | 83 | – | – |
| ⋮ | ⋮ | ⋮ | ⋮ | ⋮ | ⋮ | ⋮ | ⋮ |

FIG. 4

| VEHICLE TYPE 210 | YEAR 212 | SERVICE CENTER ID | | | | | |
|---|---|---|---|---|---|---|---|
| | | 01 | 02 | 03 | 04 | 05 | 06 |
| OLDS CUTLASS | 88 | 22 | 02 | – | – | – | 99 |
| PONTIAC SUNBIRD | 95 | 18 | – | 47 | 17 | – | – |
| MACK | 91-94 | – | – | – | – | 16 | – |
| PETERBILT | – | 22 | 02 | 47 | 17 | 16 | 99 |
| ⋮ | ⋮ | ⋮ | ⋮ | ⋮ | ⋮ | ⋮ | ⋮ |

FIG. 5

| SERVICE CENTER ID | VOICE ACCESS PARAMETERS | DATA ACCESS PARAMETERS |
|---|---|---|
| 01 | 800-555-1212 | node @ NETWORK |
| 02 | 617-123-4567 | www.sp02.com |
| 12 | truck/line ID | – |
| 16 | – | 800-999-8888 |
| 17 | ext. 543 | – |
| ⋮ | ⋮ | ⋮ |
| 103 | – | 42.137.205.12 |
| 106 | 214-987-6543 | channel group/channel |
| 110 | 001-4329 | VPI/VCI |

SYSTEM AND METHOD FOR COMMUNICATING USING A VOICE NETWORK AND A DATA NETWORK

TECHNICAL FIELD OF THE INVENTION

This invention relates generally to communication technology, and more particularly to a system and method for communicating using a voice network and a data network.

BACKGROUND OF THE INVENTION

With the proliferation of sophisticated communication technology, consumers demand a wider range of communication solutions to meet their increasing needs. One solution integrates voice and data in a single communication session. For example, existing call center technology supports voice/data sessions to deliver customer services. Typically, a customer engages in a voice/data session to receive a predefined service. A customer may dial a 1-800 number to place an order for clothing with a mail order organization, to trade stocks or mutual funds, or to perform some other suitable transaction. Often these voice/data sessions include a conversation with a live operator that can access data related to the service.

Many of these existing technologies use the same path to communicate both voice and data, which may require more sophisticated equipment at both ends of the communication link. Moreover, these technologies may only contemplate and support the provisioning of a single service. Furthermore, these technologies may not be adaptable to a mobile environment or configurable to provide a variety of data messaging and content in an integrated voice/data system.

SUMMARY OF THE INVENTION

In accordance with the present invention, a communication system and method are provided that substantially eliminate or reduce disadvantages or problems associated with previously developed communication systems and methods. In particular, the present invention provides a system and method for communicating using a voice network and a data network.

In one embodiment of the present invention, a system for communicating using a voice network and a data network includes a mobile unit coupled to the voice network. The mobile unit communicates a service message in a first call using the voice network. A network switching center (NSC) coupled to the voice network and the data network includes a switch that receives the first call initiated by the mobile unit and initiates a second call to a service center using the voice network. The NSC also includes a router that communicates a data message to the service center using the data network. Both the second call and the data message specify an identifier of the mobile unit. The service center coupled to the voice network and the data network associates the second call and the data message using the identifier of the mobile unit.

In another embodiment of the present invention, an apparatus for communicating using a voice network and a data network includes a profile table that stores information relating a mobile unit to a service center. A switch coupled to the voice network receives a service message in a first call and initiates a second call to the service center specified in the profile table. A router communicates a data message to the service center using the data network, wherein the second call and the data message specify an identifier of the mobile unit.

Technical advantages of the present invention include an arrangement of mobile units, one or more NSCs, and one or more service centers. These components of a communication system combine to provide a variety of voice/data sessions between the mobile units and the service centers. The mobile units direct requests for service to the NSC which may then access information to direct both a voice component and a data component to the appropriate service center to establish a voice/data session. The NSC maintains profile information to relate individual or groups of mobile units to associated service centers and access information to establish both a voice path and a data path to the selected service center.

Other important technical advantages of the present invention include the use of a separate voice path and data path between the NSC and the selected service center. To ensure proper association of the voice and data components of a voice/data session, the NSC provides an identifier of the mobile unit in both the voice call and the data message to the service center. In a particular embodiment, the NSC specifies the identifier of the mobile unit as automatic number identification or caller ID information associated with the voice call. The service center associates the voice and data components using the identifier of the mobile unit to establish the voice/data session.

Still other important technical advantages of the present invention include the adaptation of the invention to provide a variety of services in a mobile environment. In a particular embodiment, mobile units are associated with cars, trucks, boats, barges, airplanes, cargo holders, persons or other mobile items that may desire a selection of services. These services may include emergency services, roadside assistance, information services (e.g., directions, news and weather reports, financial quotes, etc.), or other services. The NSC maintains information to relate and provide these services upon request by the mobile units. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 3 illustrates an exemplary embodiment of a profile table maintained by the NSC;

FIG. 4 illustrates another exemplary embodiment of a profile table maintained by the NSC;

FIG. 5 illustrates an exemplary embodiment of a service table maintained by the NSC;

DETAILED DESCRIPTION OF THE INVENTION

Figure 1:
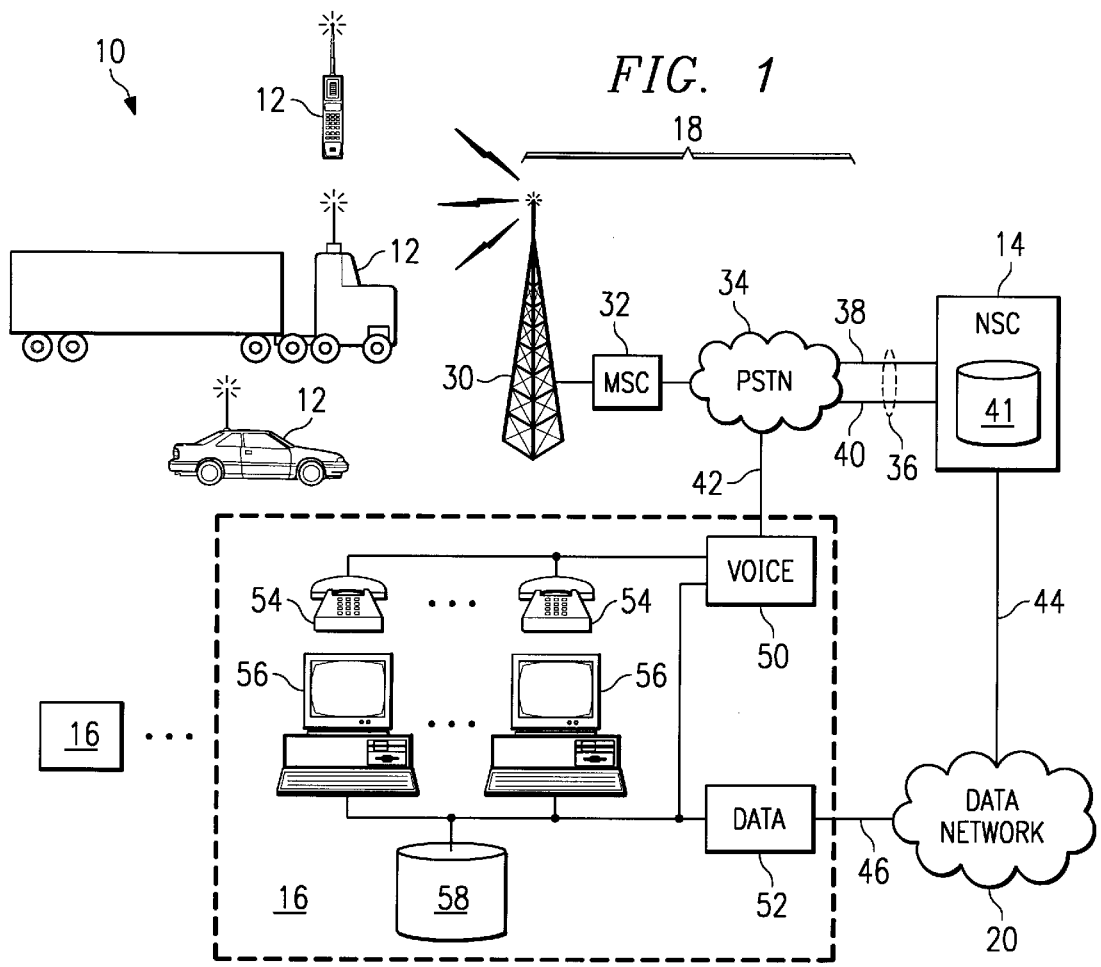
FIG. 1 illustrates a communication system that includes mobile units, a network switching center (NSC), and service centers.

FIG. 1 illustrates communication system 10 that includes a number of mobile units 12, a network switching center (NSC) 14, and a number of service centers 16. These components of communication system 10 communicate using voice network 18 and data network 20. In general, NSC 14 receives a request for service from mobile unit 12 and establishes a voice/data session with an appropriate service center 16.

Mobile units 12 may be hand-held or portable devices associated with any mobile items, such as cars, trucks, boats, barges, airplanes, cargo holders, persons, or other items that are movable or mobile. Mobile units 12 may communicate with sensors to provide information on the location or status of mobile unit 12 or its associated mobile item. For example, a global positioning system (GPS) location receiver may be disposed at or near mobile unit 12 to determine the location of an associated vehicle. Mobile unit 12 may also receive information from alarms, odometers, speedometers, engine sensors, accelerometers, temperature gauges, humidity gauges, personal health sensors, or any other suitable sensors that generate information on the status of mobile unit 12 or its associated mobile item. U.S. Pat. No. 5,539,810 describes a particular embodiment of mobile unit 12, and is hereby incorporated by reference for all purposes.

Mobile units 12 couple to NSC 14 using voice network 18. Voice network 18 comprises cell transmitter sites 30, mobile switching centers (MSCs) 32, and the various components of the public switched telephone network (PSTN) 34. Voice network 18 may also include any other suitable land-based or satellite-based transmitting and receiving components. Although shown illustratively as single components of a cellular telephone network coupled to PSTN 34, voice network 18 generally comprises any suitable number and collection of telecommunication hardware and associated software that provides a voice path between mobile unit 12 and NSC 14.

Voice paths 36 couple voice network 18 to NSC 14. Incoming voice path 38 establishes voice communication between mobile unit 12 and NSC 14, and outgoing voice path 40 establishes communication between NSC 14 and service center 16. Voice paths 36 may be individual lines, multiple lines, trunks, multiple trunks, or any other suitable collection of lines, trunks, and/or other suitable paths to support one or more voice paths.

NSC 14 couples to service center 16 using a voice path that includes outgoing voice path 40, PSTN 34, and voice path 42. NSC 14 also couples to service center 16 using a data path that includes data path 44, data network 20, and data path 46. NSC 14 maintains a database 41 that contains information on customer profiles, mobile units 12, service centers 16, and pending messages to be communicated between mobile units 12 and service centers 16. The contents of database 41 are described in more detail below with reference to FIGS. 2–6.

Data network 20 may include hardware and software to establish a dedicated data path between NSC 14 and service center 16, using frame relay, X.25, TCP/IP, or any other suitable dedicated communication protocol. Alternatively, data network 20 may include hardware and software to implement a non-dedicated, switched, or dial-up data path between NSC 14 and service center 16. Data network 20 and data paths 44 and 46 may be wireline, wireless, or a combination of wireline and wireless technologies. For example, data network 20 may comprise a portion of PSTN 34 that establishes a dial-up modem connection that is separate from voice path 40. In a particular embodiment, the data path established by data network 20 and data paths 44 and 46 provide a sufficiently small transmission time to enable data associated with the voice/data session to arrive at service center 16 simultaneously or in advance of the call over the voice path established by PSTN 34 and voice paths 40 and 42.

Communication system 10 comprises one or more service centers 16 to provide a variety of voice/data services to mobile unit 12. Service center 16 receives a call or voice component of the voice/data session at voice module 50 and a message or data component of the voice/data session at data module 52. Depending on the particular implementation, the number of agent stations served, the capacity and loading characteristics of service center 16, and other considerations, voice module 50 may comprise an automatic call distributor (ACD), a private branch exchange (PBX), a simple call distributor, or other suitable hardware and software to receive and distribute the voice component of the voice/data session to one of a number of voice instruments 54 in service center 16. Similarly, data module 52 may comprise hardware and software associated with a local area network (LAN), wide area network (WAN), or other suitable technology that couples the data component of the voice/data session to one of a number of workstations 56 in service center 16. An agent or customer representative operates voice instrument 54 and an associated workstation 56 to conduct the voice/data session with the user of mobile unit 12. It should be understood that voice module 50 and data module 52 may be integral or separate components, and may support a variety of telephony/data applications and/or protocols, such as TAPI, TSAPI, and CTI.

Service center 16 also includes database 58 which contains information related to the services offered by the particular service center 16. For example, if service center 16 provides direction services, then database 58 may store maps, geographical coordinates, or other information that allows service center 16 to provide directions to the users of mobile units 12 in both audible and data formats. Similarly, database 58 may store personal medical information, dispatch numbers, emergency personnel locations, or other information that allows service center 16 to dispatch assistance to the users of mobile units 12 in need or distress. Database 58 may also store information to provide load brokering services, vehicle monitoring, weather reporting, financial and news services, or any other suitable information services. Generally, services offered by service center 16 may comprise emergency services, roadside assistance, and a variety of information services.

In operation, mobile unit 12 generates a request for service in response to user interaction or an automatically triggered event. This request for service may be in the form of a service message transmitted in a voice call placed by mobile unit 12 to NSC 14 using voice network 18. NSC 14 receives this service message and accesses information maintained in database 41 to determine the appropriate service center 16 to satisfy the request. NSC 14 also retrieves access information from database 41 to establish a voice/data session with the determined service center 16. NSC 14 then establishes a voice path (e.g., by initiating a voice call) with voice module 50 in service center 16 using PSTN 34 and voice paths 40 and 42. NSC 14 also communicates a data message to data module 52 using data network 20 and data paths 44 and 46. Both the call and the data message from NSC 14 to service center 16 include an identifier of mobile unit 12.

Service center 16 receives the call at voice module 50 and the data message at data module 52. Voice module 50 transfers or directs the call to a selected voice instrument 54 and communicates associated automatic number identification (ANI) information, caller ID, or other identifier of the mobile unit 12 to an associated workstation 56. Workstation 56 retrieves the data message with the same mobile unit identifier from data module 52.

The agent using voice instrument 54 and associated workstation 56 then conducts the voice/data session with mobile unit 12. The voice/data session may include access to database 58 to fulfill the services requested by mobile unit 12, together with bidirectional voice and/or data communication between mobile unit 12, NSC 14, and/or service center 16. The display on workstation 56 may display map locations, status information, or other information received from NSC 14 or mobile unit 12 itself that relates to the status or location of mobile unit 12 and/or its associated mobile item.

Figure 2:
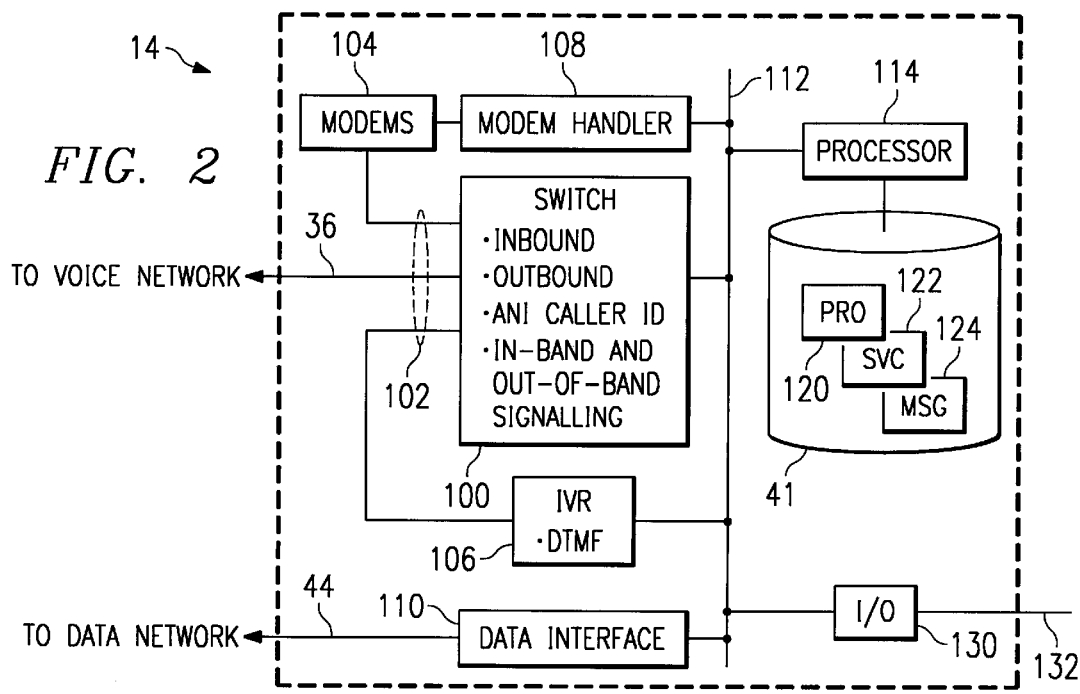
FIG. 2 illustrates in more detail the NSC.

FIG. 2 illustrates in more detail the components of NSC 14. A switch 100 couples to voice network 18 using voice paths 36. Switch 100 includes hardware and associated software to process manipulate, switch, and manage a variety of voice paths 102 in NSC 14. For example, switch 100 may receive inbound calls from voice network 18 or place outbound calls to voice network 18. Also, switch 100 includes ANI generation or caller ID techniques that can include an identifier of mobile unit 12 on outbound calls to service center 16. This is an important aspect of the operation of NSC 14 which allows service center 16 to associate the voice component and the data component of a voice/data session. The generation and communication of ANI or caller ID information may be performed by switch 100 using any suitable in-band (.e.g., DTMF) or out-of-band (e.g., SS-7) technique. This may be performed by overriding identifiers of NSC 14 or voice path 40 that may normally be associated with the call directed to service center 16.

Switch 100 may also establish voice paths with modems 104 and an interactive voice response (IVR) unit 106. Modems 104 and modem handler 108 allow NSC 14 to establish modem connections for high capacity data communication among mobile units 12, service centers 16, and other external devices accessible through voice network 18. IVR unit 106 provides interactive voice response sessions among components in communication system 10, and may also provide communication between NSC 14, mobile units 12, and service centers 16 using dual tone multi-frequency (DTMF) techniques. In a particular example, switch 100 directs a service message received from mobile unit 12 to switch 100 or IVR unit 106 for DTMF decoding. NSC 14 contemplates modems 104, DTMF coders/decoders, or any other suitable coding and/or decoding technique to communicate data using voice paths 102.

A data interface 110 couples to data network 20 using data path 44. Data interface 110 comprises a bridge, router, gateway, adapter card, or any other suitable collection of hardware and/or software to provide data communication capability between NSC 14 and data network 20. In a particular embodiment, data interface 110 supports a variety of dedicated data communication protocol, such as frame relay, X.25, TCP/IP, or other suitable dedicated protocol. Data interface 110 may also support a variety of non-dedicated, switched, or dial-up technology and protocols as well.

Modem handler 108, switch 100, IVR unit 106, and data interface 110 all couple to data bus 112. A processor 114 also couples to data bus 112 and provides overall management and control of NSC 14. Processor 114 accesses information maintained in database 41 to perform its functions. This information includes a profile table 120, a service table 122, and a message queue 124 which are described in more detail below with reference to FIGS. 3–6. An input/output (I/O) module 130 also couples to data bus 112 and provides external access to the operation and function of NSC 14 using link 132. I/O module 130 and link 132 may be used to externally control or monitor the operation of NSC 14, and may also be used to link and coordinate operation between a number of NSCs 14 in a network configuration.

In operation, switch 100 of NSC 14 receives a service message from mobile unit 12 using voice path 36. Switch 100 then recognizes the communication as a service message and, in a particular embodiment, communicates the service message over one of its voice paths 102 to IVR unit 106 for DTMF decoding. Switch 100 may also perform the DTMF decoding or may pass the service message to modems 104 and modem handler 108 for decoding. Decoding of service message by a DTMF decoder in IVR unit 106 or switch 100 may provide better accuracy and reliability in receiving the service message from mobile unit 12.

Upon decoding the service message, modem handler 108, switch 100, or IVR unit 106 passes information contained in the service message to processor 114 using data bus 112. Processor 114 then accesses profile table 120 to determine the appropriate service center 16 based on the contents of the service message. Processor 114 also accesses service table 122 to determine the access parameters to establish both voice and data communication with the selected service center 16. Processor 114 may also store data messages received from or to be transmitted to mobile units 12 and/or service centers 16 in message queue 124.

Upon determining service center 16 and the appropriate information to access service center 16, processor 114 directs switch 100 to place an outbound call to service center 16 using voice path 40 and voice network 18. Using either in-band or out-of-band signaling, switch 100 also associates an identifier of mobile unit 12 with the call placed to service center 16. Processor 114 also directs data interface 110 to communicate a data message to service center 16 using data path 44 and data network 20. Both the call placed to service center by switch 100 and the data message communicated to service center by data interface 110 are associated with an identifier of mobile unit 12 to allow service center 16 to associate the voice component and the data component of the voice/data session.

Upon establishing voice communication with service center 16, switch 100 bridges or connects the original inbound call from mobile unit 12 with the outbound call to service center 16 to establish a voice path between mobile unit 12 and service center 16. At any time before, during, or after the voice/data session, switch 100 may direct the inbound call from mobile unit 12 or the outbound call to service center 16 to modems 104 and modem handler 108 to conduct a high speed data exchange between mobile unit 12, NSC 14, and/or service center 16. Switch 100 may also direct the inbound call from mobile unit 12 or the outbound call to service center 16 to IVR unit 106 to conduct an interactive voice response session with mobile unit 12 and/or service center 16. During modem or IVR communication, mobile unit 12 may provide location and/or status information to be included in a data message for eventual delivery to service center 16. Also, NSC 14 may provide data to mobile unit 12 for software updates, remote commanding (e.g., door unlock, alarm disable, etc.), authorized number programming, feature flag setting, or other function. Moreover, service center 16 may provide information relating to the emergency service, roadside assistance, or other information services requested by mobile unit 12.

FIG. 3 illustrates an exemplary embodiment of profile table 120 stored in database 41 of NSC 14. Entries in table 120 relate an identifier 200 of mobile unit 12 with an identifier 202 of service center 16. In this particular embodiment, identifier 200 of mobile unit 12 may comprise the mobile identification number and/or electronic serial number (MIN/ESN) 204, a vehicle identification number (VIN) 206, or any other suitable information associated with or identifying mobile unit 12. Identifiers 202 of service center 16 are further related to call types 208 specified in the service message received from mobile unit 12. Therefore, in a particular embodiment, an identifier 200 of mobile unit 12 and call type 208 together specify an identifier 202 of the appropriate service center 16 to handle the service request. Profile table 120 includes an entry for each mobile unit 12 serviced by communication system 10.

FIG. 4 illustrates an alternative exemplary embodiment of profile table 120 that identifies mobile units 12 in groups to reduce memory requirements and provide quicker and more efficient access to the contents of profile table 120. In this embodiment, identifiers 200 of mobile unit 12 comprise a vehicle type 210, year 212, or other grouping or association of mobile units 12 or mobile items associated with mobile units 12. Vehicle type 210 specifies the manufacturer, model, style, or other information of a type of vehicle, whereas year 212 specifies a year or range of years. In this manner, profile table 120 illustrated in FIG. 4 can maintain logical groupings that associate service centers 16 depending on the type and make of the vehicle associated with mobile unit 12. Vehicle type 210, year 212, and other model and make information may be included in the service message transmitted to NSC 14 or maintained as customer profile information at NSC 14.

FIG. 5 illustrates an exemplary embodiment of service table 122 that includes voice access parameters 220 and data access parameters 222 to establish voice and data communication, respectively, with service centers 16 in communication system 10. Voice access parameters 220 may comprise telephone numbers, telephone extensions, trunk/line identifiers, or any other address or identifier supported by voice network 18. Data access parameters 222 may include LAN or WAN addresses, uniform resource locator (URL) addresses, telephone numbers, transport control protocol or Internet protocol (TCP/IP) addresses, channel groups and channels, virtual port identifiers (VPIs), virtual channel identifiers (VCIs), or any other address or identifier supported by data network 20.

Figure 6:
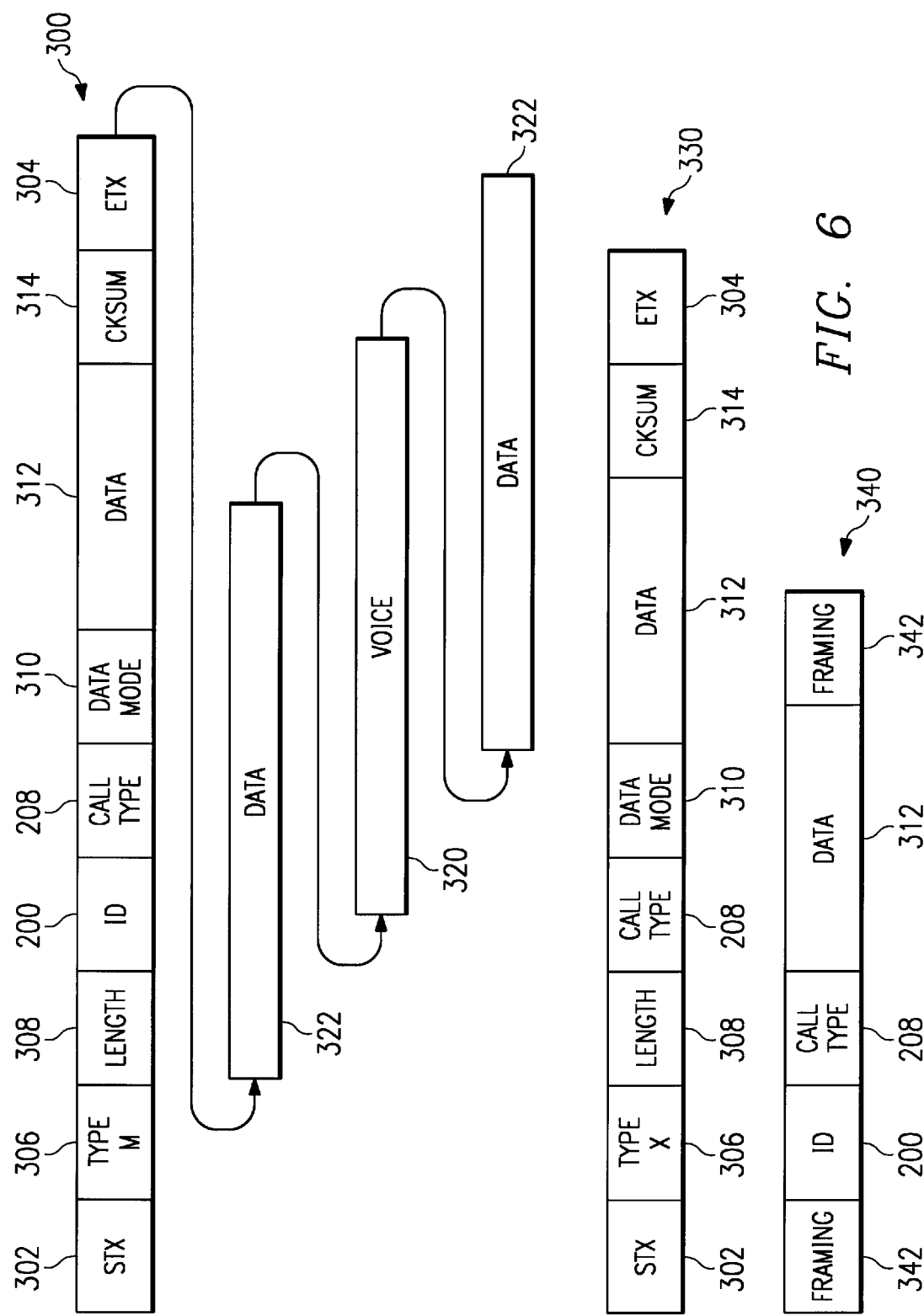
FIG. 6 illustrates exemplary message formats and messaging techniques used in the communication system.

FIG. 6 illustrates a variety of message formats and messaging techniques used in communication system 10. Message queue 124 may store information temporarily or permanently in any of these message formats. A service message 300 incudes a start field (STX) 302 and an end field (ETX) 304. Service message 300 also includes a message type 306 and length 308. NSC 14 uses identifier 200 and optionally call type 208 provided in service message 300 to determine service center 16 using profile table 120. A data mode 310, which is described below, indicates whether communications between mobile unit 12 and NSC 14 should include a data mode (e.g., modems, DTMF, etc.) to exchange information. Data 312 in service message 300 may include a date and time, position coordinates of mobile unit 12, sensor readings generated or gathered by mobile unit 12, alarm conditions, or any other information communicated from mobile unit 12 to NSC 14. NSC 14 uses a checksum 314 to ensure the integrity and accuracy of service message 300 received from mobile unit 12.

In a particular embodiment, mobile unit 12 communicates service message 300 to NSC 14 using DTMF techniques. Switch 100 or IVR unit 106 decodes service message 300 and passes this information to processor 114. Depending on the value of data mode 310, communication between mobile unit 12 and NSC 14 may then progress directly to voice mode 320. However, depending on the requested service, the data required, and other factors, mobile unit 12 and NSC 14 may engage in a data mode 322 before and/or after voice mode 320.

In some circumstances, NSC 14 receives a priority service message 330 during preexisting communication between mobile unit 12 and NSC 14. Since mobile unit 12 and NSC 14 have already established a voice path using voice network 18, priority service message 330 may not need to include identifier 200 of mobile unit 12. Upon receiving priority service message 330, NSC 14 suspends or terminates preexisting communications between mobile unit 12 and NSC 14 and establishes a voice/data session with an appropriate service center 16 to provide the priority service.

Data message 340 communicated by NSC 14 to service center 16 includes framing data 342 suitable for the communication protocol supported by data network 20. Data message 340 also includes identifier 200 of mobile unit 12 and optionally call type 208. Workstation 56 in service center 16 may display graphically or textually data 312 contained in data message 340 as part of the voice/data session between mobile unit 12 and service center 16.

Figure 7:
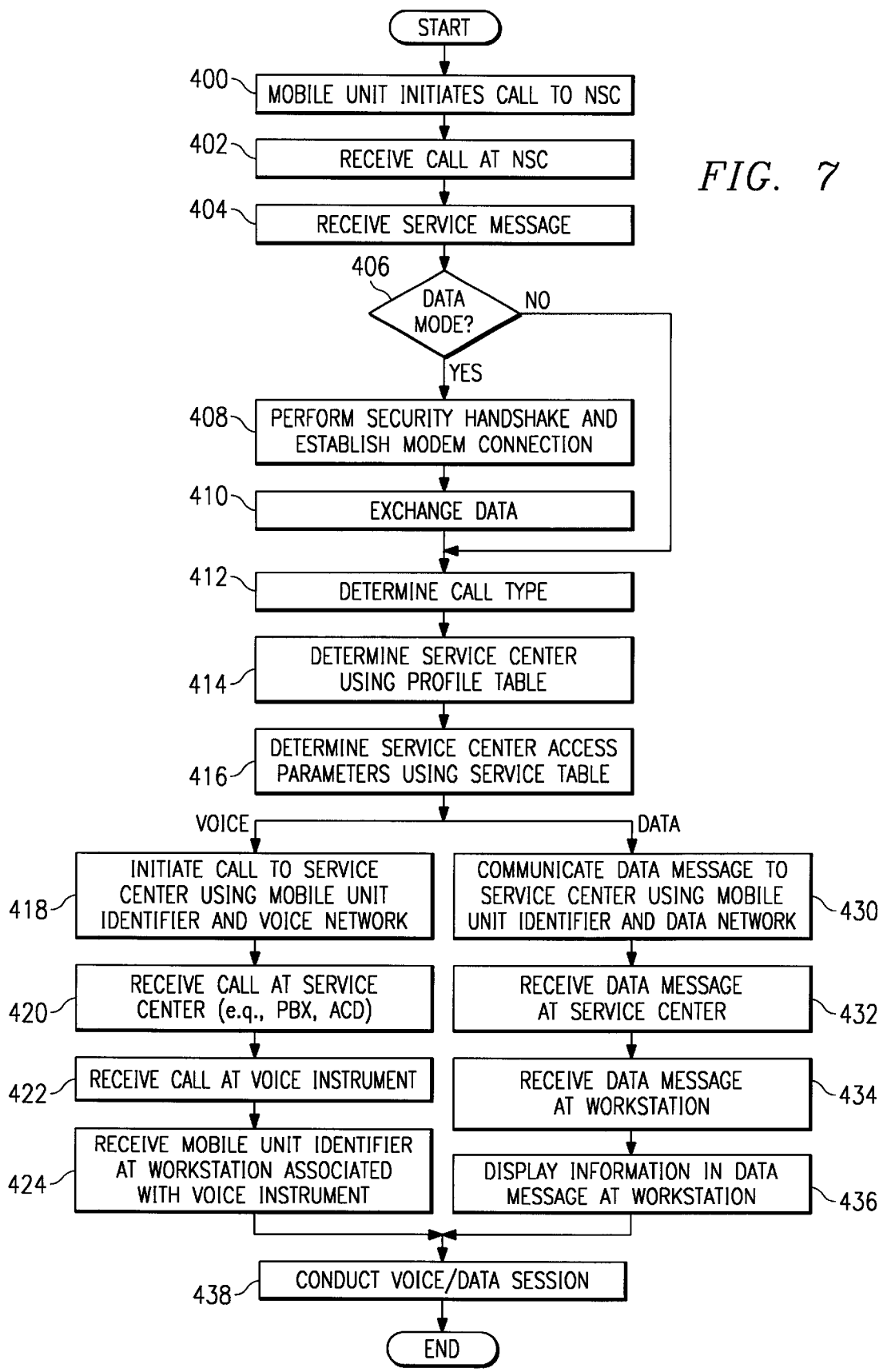
FIG. 7 is a flow chart of a method of operation of the communication system.

FIG. 7 is a flow chart of a method of operation of communication system 10. The method begins at step 400 where mobile unit 12 initiates a call to NSC 14. For example, mobile unit 12 may initiate a 1-800 voice call to NSC 14 in response to user interaction or an automatically triggered event, such as an alarm condition, sensor out of limit measurement, emergency condition, or other event. NSC 14 receives the call at step 402 and receives service message 300 or priority service message 330 at step 404. In a particular embodiment, switch 100 or IVR unit 106 receives and decodes service message 300 using DTMF techniques for more accurate and reliable reception.

Depending on the value of data mode 310 of service message 300 at step 406, mobile unit 12 and NSC 14 may perform a security handshake and establish a modem connection at step 408. Upon establishing a secure modem connection, mobile unit 12 and NSC 14 exchange data at step 410. Data sent to NSC 14 may include location and/or status information regarding the operation of mobile unit 12 or its associated mobile item. Data sent to mobile unit 12 may include software updates, remote commands, messages, or other information. U.S. Pat. No. 5,398,810, which has been incorporated by reference, describes a particular embodiment of establishing a security handshake and modem connection to exchange data between mobile unit 12 and NSC 14. If mobile unit 12 and NSC 14 do not enter a data mode as determined at step 406 or the exchange of data is complete at step 410, then NSC 14 determines call type 208 from service message 300 or priority service message 330 at step 412.

Call type 208 may specify a variety of services, including roadside assistance, emergency services, load brokering services, weather reports, news reports, directions, or any other suitable information service. NSC 14 determines a suitable service center 16 using profile table 120 at step 414. In a particular embodiment, NSC 14 may first access profile table 120 of FIG. 4 for quicker and more efficient access, and then revert to profile table 120 of FIG. 3 if necessary. NSC 14 determines access parameters 220 and 222 that correspond to the selected service center 16 using service table 122 at step 416.

NSC 14 establishes separate voice and data components of the voice/data session between mobile unit 12 and service center 16, as illustrated by the two paths in the flow chart of FIG. 7. To establish the voice component, NSC 14 initiates a call to service center 16 using mobile unit identifier 200 and voice network 18 at step 418. In a particular embodiment, switch 100 of NSC 14 specifies identifier 200 in an automatic number identification (ANI) field or caller ID field using in-band and/or out-of-band signaling techniques. Service center 16 receives the call and any associated signaling at voice module 50 at step 420, and voice instrument 54 receives the call at step 422. Workstation 56 associated with voice instrument 54 receives mobile unit identifier 200 at step 424. As soon as service center 16 acknowledges delivery of the call to voice instrument 54, NSC 14 bridges or connects the inbound call from mobile unit 12 to the outbound call to service center 16 to establish the completed voice path between mobile unit 12 and service center 16.

To establish the data component of the voice/data session, NSC 14 communicates data message 340 to service center 16 using mobile unit identifier 200 and data network 18 at step 430. Data module 52 of service center 16 receives data message 340 at step 432, and workstation 56 receives data message 340 at step 434. Workstation 56 displays graphically or textually data 312 contained in data message 340 at step 436. Upon associating the voice component established by steps 418–424 and the data component established by steps 430–436, the user at mobile unit 12 and an agent at service center 16 conduct a voice/data session at step 438.

The association of data and voice using mobile unit identifier 200 may be performed in a number of ways. In one embodiment, service center 16 first establishes the voice component and selects voice instrument 54 and its associated workstation 56 by performing steps 418–424. Then, the selected workstation 56 retrieves data message 340 having the same mobile unit identifier 200 at step 434. In another embodiment, service center 16 first establishes the data component and selects a workstation 56 by performing steps 430–436. Then, voice instrument 54 associated with the selected workstation 56 receives the call at step 422.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating using a voice network and a data network, the system comprising:
   a mobile unit coupled to the voice network and operable to communicate a service message in a first call using the voice network;
   a network switching center coupled to the voice network and the data network, the network switching center comprising a switch operable to receive the first call and to initiate a second in response to the content of the service message using the voice network, the network switching center further comprising a router operable to communicate a data message in response to the content of the service message using the data network, wherein the second call and the data message specify an identifier of the mobile unit, the network switching center being further operable to:
   access a profile table in a database to determine a service center that can satisfy the service request;
   access a service table in the database to determine a voice access parameter and a data access parameter for the determined service center;
   use the voice access parameter to initiate the second call; and
   use the data access parameter to initiate the communication of the data message; and
   a service center coupled to the voice network and the data network, the service center operable to receive the second call and the data message, the service center further operable to associate the second call and the data message using the identifier of the mobile unit.

2. The system of claim 1, wherein the mobile unit is associated with a vehicle.

3. The system of claim 1, wherein the service message comprises a priority service message received during pre-existing communication between the mobile unit and the network switching center.

4. The system of claim 1, wherein the service message specifies a data mode in which the mobile unit and the network switching center exchange information.

5. The system of claim 1, wherein the profile table stores information relating the mobile unit to the service center.

6. The system of claim 1, wherein the profile table stores information relating the mobile unit to the service center based on a call type specified in the service message.

7. The system of claim 6, wherein the call type indicates a request for emergency services, roadside assistance, or information services.

8. The system of claim 1, wherein the profile table stores information relating the mobile unit to the service center and the service table stores the voice access parameter and the data access parameter associated with the service center.

9. The system of claim 1, wherein the switch specifies the identifier of the mobile unit in an automatic number identification field of the second call.

10. The system of claim 1, wherein the service message and the data message specify the location of the mobile unit.

11. The system of claim 1, wherein the service message and the data message specify the status of the mobile unit.

12. The system of claim 1, wherein the service message indicates that a user of the mobile unit desires a service provided by a service center.

13. The system of claim 1, wherein the service center further comprises a plurality of agent stations.

14. The system of claim 1, wherein the service center is further operable to establish a voice/data session between an operator of the mobile unit and an agent at the service center.

15. The system of claim 1, wherein the network switching center is further operable to generate the data message in response to the content of the service message.

16. The system of claim 1, wherein the network switching center is further operable to generate the data message in response to the content of the service message, the data message including data from the service message.

17. The system of claim 1, wherein the network switching center is further operable to initiate the second call and to communicate the data message while maintaining the first call.

18. The system of claim 1, wherein the network switching center is further operable to bridge the first call and the second call to establish a voice path between the mobile unit and the service center.

19. The system of claim 18, wherein an agent at the service center and the user of the mobile unit can exchange voice communications using the voice path.

20. The system of claim 1, wherein the voice network and the data network are separate networks.

21. An apparatus for communicating using a voice network and a data network, the apparatus comprising:

a switch coupled to the voice network and operable to receive a service message from a mobile unit in a first call, the switch further operable to initiate a second call to a service center using the voice network;

a router coupled to the switch and the data network and operable to communicating a data message to the service center using the data network; and a processor coupled to the switch and the router, the processor operable to receive the service message from the switch and to determine a service center in response to the content of the service message, the processor further operable to instruct the switch to initiate the second call to the service center using the voice network and to instruct the router to initiate the communication of the data message to the service center using the data network, the processor being further operable to:

access a profile table in a database to determine a service center to satisfy the service request;

access a service table in the database to determine a voice access parameter and a data access parameter for the determined service center;

use the voice access parameter to initiate the second call; and use the data access parameter to initiate the communication of the data message;

wherein the second call and the data message specify an identifier of the mobile unit.

22. The apparatus of claim 21, wherein the service message comprises a priority service message received during preexisting communication between the apparatus and the mobile unit.

23. The apparatus of claim 21, wherein the profile table is operable to store information relating the mobile unit to the service center based on a call type specified in the service message.

24. The apparatus of claim 23, wherein the call type indicates a request for emergency services, roadside assistance, or information services.

25. The apparatus of claim 21, wherein the service table stores the voice access parameter and the data access parameter associated with the service center.

26. The apparatus of claim 21, wherein the switch specifies the identifier of the mobile unit in an automatic number identification field of the second call.

27. The apparatus of claim 21, wherein the service message and the data message specify the location of the mobile unit.

28. The apparatus of claim 21, wherein the service message and the data message specify the status of the mobile unit.

29. The apparatus of claim 21, further comprising a modem coupled to the switch and operable to exchange information between the mobile unit and the apparatus during a data mode.

30. The apparatus of claim 21, further comprising an interactive voice response unit coupled to the switch and operable to provide an interactive voice response session between the mobile unit and the apparatus.

31. The apparatus of claim 21, wherein the service message indicates that a user of the mobile unit desires a service provided by a service center.

32. The apparatus of claim 21, wherein the apparatus is further operable to establish a voice/data session between a user of the mobile unit and an agent at the service center.

33. The apparatus of claim 21, wherein the processor is further operable to generate the data message in response to the content of the service message.

34. The apparatus of claim 21, wherein the processor is further operable to generate the data message in response to the content of the service message, the data message including data from the service message.

35. The apparatus of claim 21, wherein the processor is further operable to initiate the second call and the communication of the data message while the switch maintains the first call.

36. The apparatus of claim 21, wherein the switch is further operable to bridge the first call and the second call to establish a voice path between the mobile unit and the service center.

37. The apparatus of claim 36, wherein an agent at the service center and the user of the mobile unit can exchange voice communications using the voice path.

38. The apparatus of claim 21, wherein the voice network and the data network are separate networks.

39. A method for communicating using a voice network and a data network, the method comprising:

receiving a service center from a mobile unit in a first call;

determining a service center in response to the content of the server message, comprising:

accessing a profile table in a database to determine a service center to satisfy the service request;

accessing a service table in the database to determine a voice access parameter and a data access parameter for the service center;

initiating a second call to the service center using the voice access parameter in response to the content of the service message, the second call specifying an identifier of the mobile unit; and communicating a data message to the service center using the data access parameter in response to the content of the service message, the data message comprising the identifier of the mobile unit and data associated with the mobile unit.

40. The method of claim 39, wherein the mobile unit is associated with a vehicle.

41. The method of claim 39, wherein the step of receiving a service message comprises receiving a service message using DTMF techniques.

42. The method of claim 39, further comprising the steps of:

performing a security handshake with the mobile unit; and communicating data in a data mode of the first call using modem techniques upon successful completion of the security handshake.

43. The method of claim 39, wherein the service message comprises a priority service message received during preexisting communication with the mobile unit.

44. The method of claim 39, wherein the step of determining a service center comprises determining a service center in response to a call type specified in the service message.

45. The method of claim 44, wherein the call type indicates a request for emergency services, roadside assistance, or information services.

46. The method of claim 39, further comprising the step of accessing the service table before performing the steps of initiating and communicating.

47. The method of claim 39, further comprising the step of specifying the identifier of the mobile unit in an automatic number identification field of the second call.

48. The method of claim 39, wherein the data associated with the mobile unit comprises the location of the mobile unit.

49. The method of claim 39, wherein the data associated with the mobile unit comprises the status of the mobile unit.

50. The method of claim 39, wherein the service message indicates that a user of the mobile unit desires a service provided by a service center.

51. The method of claim 39, wherein the service center comprises a plurality of agent stations.

52. The method of claim 39, further comprising establishing a voice/data session between a user of the mobile unit and an agent at the service center.

53. The method of claim 39, further comprising generating the data message in response to the content of the service message.

54. The method of claim 53, wherein the data message includes data from the service message.

55. The method of claim 39, further comprising maintaining the first call while initiating the second call and communicating data message.

56. The method of claim 39, further comprising bridging the first call and the second call to establish a voice path between the mobile unit and the service center.

57. The method of claim 56, wherein an agent at the service center and the user of the mobile unit can exchange voice communications using the voice path.

58. The method of claim 39, wherein the voice network and the data network are separate networks.

* * * * *